United States Patent [19]
Framberg

[11] Patent Number: 5,341,846
[45] Date of Patent: Aug. 30, 1994

[54] VALVE STACK ASSEMBLY

[75] Inventor: Norman S. Framberg, Glenview, Ill.

[73] Assignee: Mead Fluid Dynamics, Inc., Chicago, Ill.

[21] Appl. No.: 156,088

[22] Filed: Nov. 22, 1993

[51] Int. Cl.⁵ .............................................. F16K 11/00
[52] U.S. Cl. ................................... 137/884; 137/269
[58] Field of Search ................ 137/884, 269; 251/150

[56] References Cited

U.S. PATENT DOCUMENTS

| | | | |
|---|---|---|---|
| 3,092,141 | 6/1963 | Stark. | |
| 3,554,229 | 1/1971 | Coyle. | |
| 3,601,142 | 8/1971 | Frantz | 137/269 |
| 3,707,989 | 1/1973 | Jullien-Davin | 137/884 |
| 3,814,126 | 6/1974 | Klee | 137/884 |
| 3,899,200 | 8/1975 | Gamble | 285/93 |
| 4,178,023 | 12/1979 | Randolph | 285/323 |
| 4,352,532 | 10/1982 | Hardin | 137/884 X |
| 4,456,026 | 6/1984 | Kantor | 137/315 |
| 4,519,421 | 5/1985 | Stoll | 137/596.16 |
| 5,222,715 | 6/1993 | Framberg | 251/267 |

FOREIGN PATENT DOCUMENTS

| | | | |
|---|---|---|---|
| 2516438 | 10/1976 | Fed. Rep. of Germany | 137/884 |
| 0033303 | 9/1981 | Fed. Rep. of Germany. | |

Primary Examiner—John C. Fox
Attorney, Agent, or Firm—Andrus, Scales, Starke & Sawall

[57] ABSTRACT

A valve stack assembly comprising a manifold having an inlet channel connected to a source of air. A plurality of inlet tubes each having an inner end communicating with said inlet channel and the outer end of each tube projects outwardly of the manifold and is sealed within an inlet passage of a valve. An annular collet is disposed in each inlet passage and receives the inlet tube and the collet is designed such that the tube can be freely inserted in the collet but cannot be freely withdrawn unless the collet is moved axially inward to a release position. Each valve also includes an outlet opening which receives an outlet tube mounted in the manifold and each outlet tube is connected to a transverse manifold passage which in turn is connected through a fluid line to a working element.

16 Claims, 1 Drawing Sheet

U.S. Patent  Aug. 30, 1994  5,341,846
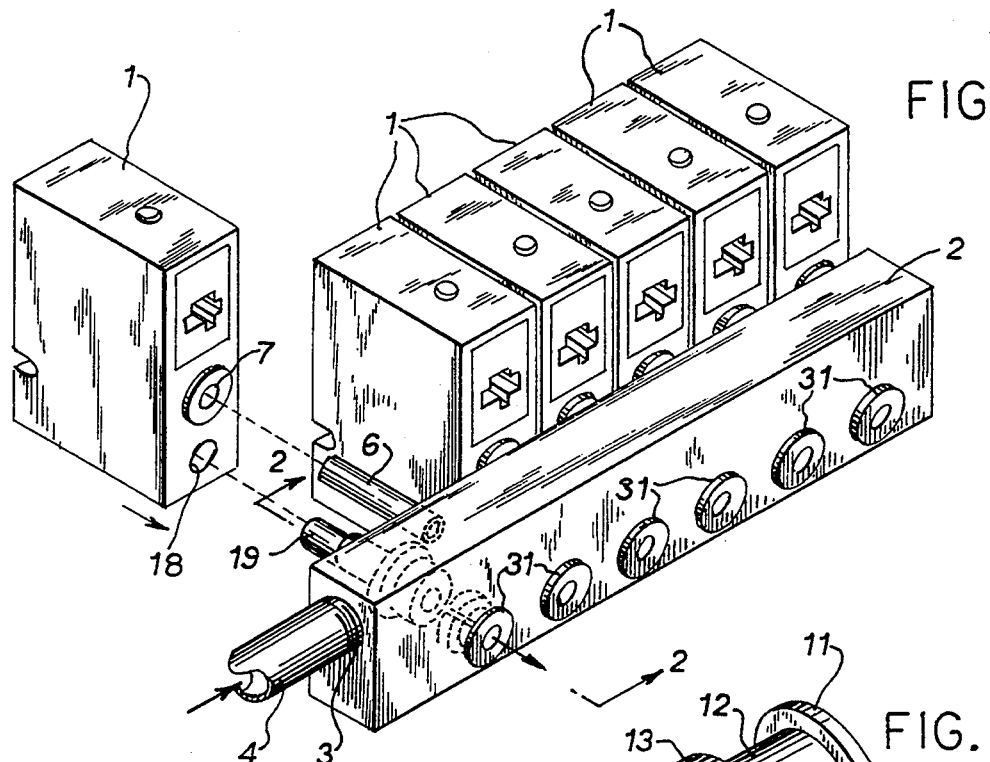
FIG. 1
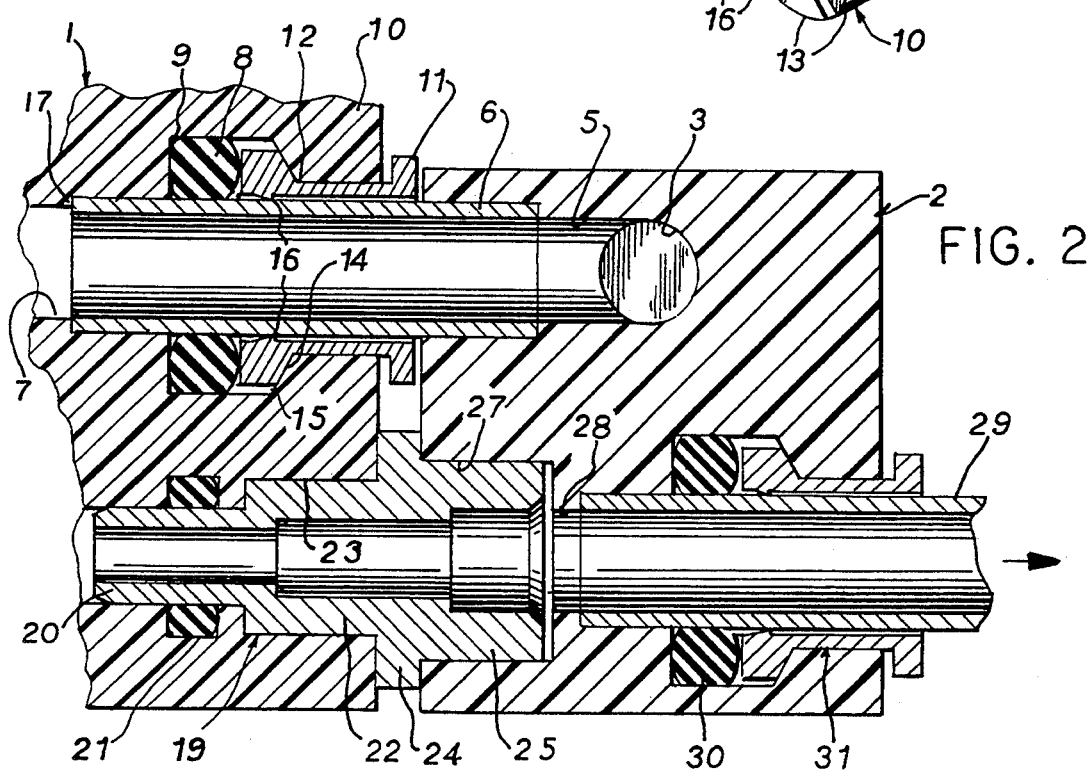
FIG. 3
FIG. 2

VALVE STACK ASSEMBLY

BACKGROUND OF THE INVENTION

Many machines incorporate a number of working elements, such as pneumatic cylinders, pneumatic motors, vacuum generators, and the like, that require a source of air or other fluid for operation.

A common practice is to mount the valves that control the flow of air to the working elements in a side-by-side stack on a manifold having an air inlet passage that is connected commonly to each of the valves. The outlet passage of each valve is also connected through an outlet in the manifold which in turn is connected via fluid lines to the working elements.

A valve stack arrangement has distinct advantages. As a common manifold is employed to supply and discharge air from the valves, the piping is substantially reduced over a system utilizing individually mounted valves. Further, the valve stack provides a central control location for inspection of the valves.

In the past, the stack of valves has been held together with end plates that trap the individual components and supply air commonly to each valve. However, the removal and replacement of a valve often requires that the entire connecting mechanism including the end plates be disassembled. This is a time consuming task and requires the use of tools.

SUMMARY OF THE INVENTION

The invention is directed to a valve stack assembly in which the valves are mounted in side-by-side relation to a manifold without the use of auxiliary supports or connectors and in which the valves can be readily installed and removed from the manifold without the use of tools.

The valve stack assembly of the invention comprises a manifold having an elongated inlet channel or passage which is connected to a source of fluid under pressure. A plurality of parallel inlet tubes are connected to the manifold with the inner end of each tube communicating with the inlet channel and the outer end of each tube projecting outwardly of the manifold.

A series of valves are mounted in side-by-side relation along the manifold and each inlet tube is received within an inlet passage of a valve and sealed to the valve by an annular seal, such as an O-ring.

An annular collet is mounted in the inlet passage of each valve and is designed so that the inlet tube of the manifold can be freely inserted into the collet but cannot be freely withdrawn, unless the collet is manually released.

Each valve also includes an outlet passage and a second tube projects outwardly from the manifold and is sealed within the outlet passage. The inner end of each second tube is secured within one end of a transverse discharge passage of the manifold and the opposite end of each discharge passage is connected through a fluid line to a working element, such as a pneumatic cylinder.

With this construction, each valve is supported solely from the manifold through the pair of tubes which project outwardly from the manifold and the collet prevents the valve from being freely withdrawn or displaced from the tubes. To remove a valve, an outer flange on the collet, which projects outwardly of the valve, is moved inward by manual force, thereby releasing the collet and permitting the valve to be withdrawn from the manifold.

The construction of the invention enables each valve to be readily and rapidly removed from the manifold merely by manual release of the collet. This can be accomplished without the use of tools and without the necessity of disassembling connecting end plates or other connectors as has been required in the past.

The invention, by using a common manifold, reduces the necessary piping or fluid lines and correspondingly reduces the potential for leakage which accompanies the increased use of fluid lines and fittings. The stacking of the valves also centralizes the location of the valves to simplify inspection and trouble-shooting. Moreover the stack of valves provides an improved appearance, as opposed to a situation in which the valves are individually mounted at various locations on the machine.

Other objects and advantages will appear during the course of the following description.

DESCRIPTION OF THE DRAWINGS

The drawings illustrate the best mode presently contemplated of carrying out the invention.

In the drawings:

FIG. 1 is an exploded perspective view of the valve stacking arrangement of the invention;

FIG. 2 is a fragmentary section showing the connection of a valve to the manifold; and FIG. 3 is a perspective view of a gripping collet.

DESCRIPTION OF THE ILLUSTRATED EMBODIMENT

FIG. 1 shows a valve stacking assembly that can be utilized to mount a series of valves 1 to a manifold block 2. The individual valves 1 can be constructed in the manner described in pending U.S. patent application Ser. No. 07/891,858 filed Jun. 1, 1992, U.S. Pat. No. 5,222,715.

Manifold 2 includes a longitudinal passage 3 which is connected through a suitable fluid line 4 to a source of fluid which can take the form of a source of air under positive pressure.

As shown in FIG. 2, a series of parallel, spaced transverse passages 5 are formed in the manifold and communicate with the longitudinal passage 3. One end of a tube 6 is secured within each passage 5 by an adhesive or the like, while the opposite end of each tube 6 projects outwardly of the manifold and is received within an inlet passage 7 in valve 1.

Tubes 6 are preferably formed of a rigid material, such as metal or plastic, and have a uniform outer diameter.

As illustrated in FIG. 2, each tube 6 is sealed within the respective inlet passage 7 by an annular sealing element such as an O-ring 8 which is mounted in an annular recess 9 in valve 1. In addition, an annular collet 10 is mounted in each inlet passage 7 outboard of the O-ring 8 and the tube 6 extends through the central opening in the collet.

Collet 10 is designed such that tube 6 can be freely inserted into the collet but cannot be freely withdrawn unless the collet is manually released. Collet 10 is formed with an outer radially extending flange 11 which is located on the outside of valve 1, and a series of legs 12, preferably four legs, extend inwardly from flange 11, as best illustrated in FIG. 3. Each leg 12 terminates in an enlarged head 13.

As illustrated in FIG. 2, the enlarged heads 13, as well as the O-ring 8, are located in recess 9 that borders inlet passage 7. Each head 13 is provided with an outwardly facing inclined surface 14 which is located adjacent an inclined shoulder or abutment 15 on the valve.

In addition, one or more barbs 16 are formed on the inner surface of each leg 12 and are provided with sharpened edges which face outwardly toward flange 11.

As legs 12 are flexible in a radial direction, the collet 10 can be readily inserted into the inlet passage 7 by deforming the legs inwardly and then inserting the legs into the passage. After insertion, legs 12 will spring outwardly to the position shown in FIG. 2, where the heads 13 are located in the recess 9 of the valve.

To mount valve 1 on the manifold 2, the outer end of tube 6 is inserted into the collet 10, and the valve is pushed toward the manifold. The tube is sealed to the valve by the O-ring 8. Insertion of tube 6 into the passage 7 is limited by the engagement of the inner end of the tube with a shoulder 17 formed in the valve. With the end of tube 6 engaged with shoulder 17, collet flange 11 will be spaced outwardly of the outer surface of valve 1, as shown in FIG. 2.

Collet 10 serves to lock the valve 1 to the manifold 2 and prevents the valve from being freely withdrawn from the tube 6. If valve 1 is pulled outwardly, the inclined surface 14 on head 13 will engage the inclined shoulder 15 on the valve, thereby wedging the head 12 radially inward and bringing the barbs 16 into firm engagement with the outer surface of the tube, thus preventing free withdrawal of the valve from the tube 6.

To release the collet, flange 11 of the collet 10 is moved axially inward by manual force, thereby moving inclined surface 14 out of engagement with the inclined shoulder 15 and allowing the legs 11 to spring outward slightly, thus moving barbs 16 out of engagement with tube 6. Valve 1 can then be freely withdrawn from the tube 6.

Each valve 1 can be constructed in accordance with the valves shown in patent application Ser. No. 07/891,858 and includes one or more valve elements which control the flow of fluid through the fluid channels in the valve. The fluid is discharged from each valve through an outlet passage 18 which is located beneath the inlet passage 7 in the valve. Outlet passage 18 is connected to manifold 2 via an output stem 19. As shown in FIG. 2, stem 19 projects outwardly from the manifold and includes an outer section 20 which is received within the outlet passage 18 and is sealed therein by an annular seal such as O-ring 21.

Stem 19 is also formed with an enlarged central section 22, which is received within a recess 23 in the outer surface of valve 1 and with a radially extending flange 24, located outwardly of section 22. Flange 24 bears against the outer surface of valve 1 and serves to space the valve from the manifold. Extending inwardly from flange 24 is a section 25, which is secured by adhesives or the like within the enlarged outer section 27 of a transverse output passage 28 in manifold 2. The output passages 28 are in parallel spaced relation, as illustrated in FIG. 1.

A fluid tube 29 which is connected to a working element, such as a pneumatic cylinder, is received within the opposite end of each passage 28 in manifold 2 and is sealed within the passage by an annular seal or O-ring 30. In addition, a collet 31, similar in construction to collet 10, is mounted in the end of the passage 28 and serves to retain the tube 29 within the passage in the manner as previously described with respect to collet 10.

With the construction of the invention, the valves are supported solely by the tubes 6 and 19 which project outwardly from the manifold. Thus the tubes not only provide support for the valves but also prevent rotation of the valves and function as the fluid connection between the manifold and the valves.

The collets 10 prevent the valves from being freely withdrawn from the manifold unless the collet is manually released. The release of the collets 10, and the withdrawal of the valves 1, can be accomplished merely by moving the flange 11 of the collet inwardly and without the need of any tools or without the need of the disassembly of connectors.

By stacking the valves on the manifold, the amount of piping and the number of fittings are reduced over a system in which the valves are individually connected to a source of fluid under pressure.

Various modes of carrying out the invention are contemplated as being within the scope of the following claims, particularly pointing out and distinctly claiming the subject matter which is regarded as the invention.

I claim:

1. In a valve stack assembly, a manifold having an inlet channel connected to a source of fluid, a plurality of first tubes each having an inner end communicating with said channel and each having an outer end projecting outwardly of the manifold, a plurality of valves each having an inlet passage connected to the projecting end of one of said tubes, a collet disposed the inlet passage of each valve and having a central opening to receive the tube, each collet being constructed and arranged such that the tube can be freely inserted in the collet but cannot be freely withdrawn, and release means associated with each collet for releasing engagement of the collet with said tube on inward axial movement of said collet relative to said valve.

2. The assembly of claim 1, and including annular sealing means located in said inlet passage and disposed longitudinally inward of said collet for engaging the outer surface of said tube.

3. A valve stack assembly, comprising a manifold having an inlet channel connected to a source of fluid, a plurality of first tubes each having an inner end communicating with said channel and each having an outer end projecting outwardly of the manifold, a plurality of valves mounted in side-by-side relation on the manifold, each valve having an inlet passage connected to one of said first tubes and having an outlet passage, a collet disposed in the inlet passage of each valve and having a central opening to receive one of said first tubes, each collet being constructed and arranged such that the first tube can be freely inserted in the collet but cannot be freely withdrawn, release means associated with each collet for releasing engagement of the collet with the first tube on inward axial movement of the collet relative to the valve, a plurality of second tubes each having an outer end projecting outwardly of the manifold and received within the outlet passage of a valve, and outlet means in the manifold and connected to each second tube for delivering fluid being discharged through said outlet passage to a working site.

4. The assembly of claim 3, and including first sealing means for sealing each first tube to the respective inlet passage.

5. The assembly of claim 4, and including second sealing means for sealing each second tube to the respective outlet passage.

6. The assembly of claim 3, wherein each first tube has a cylindrical outer surface of uniform diameter.

7. The assembly of claim 3, and including spacing means associated with each second tube for spacing said valve from said manifold.

8. The assembly of claim 7, wherein said spacing means comprises an annular flange projecting outwardly from said second tube and disposed to engage the outer surface of said valve.

9. The assembly of claim 3, wherein said outlet means comprises a plurality of apertures extending transversely of said inlet channel, one end of each aperture receiving a second tube.

10. The assembly of claim 9, and including connecting means for connecting a delivery conduit to the opposite end of each aperture.

11. A valve stack assembly, comprising a manifold having an inlet channel connected to a source of fluid under pressure, a plurality of parallel tubes disposed generally normal to the axis of said inlet channel, each first tube having an inner end communicating with said channel and having an outer end projecting outwardly of said manifold, a plurality of valves disposed in side-by-side relation on the exterior of said manifold, each valve having an inlet passage and at least one outlet passage, a collet disposed in the inlet passage of each valve and having a central opening to receive one of said first tubes, each collet being constructed and arranged such that the first tube can be freely inserted in the collet but cannot be freely withdrawn, release means associated with each collet for releasing engagement of the collet with said first tube on inward axial movement of the collet relative to said valve, a plurality of second tubes each having an outer end projecting outwardly of the manifold and received within the outlet passage of a valve, said manifold being formed with a plurality of apertures extending transversely of said inlet channel, the inner end of each second tube being received within an end of an aperture, the opposite end of each aperture being connected to a fluid conduit for supplying fluid to a working element.

12. The assembly of claim 11, and including first sealing means for sealing each first tube to the respective inlet passage, and second annular sealing means for sealing each second tube to the respective outlet passage.

13. The assembly of claim 11, wherein each collet comprises an outer flange spaced outwardly of the exterior of the valve and a plurality of radially flexible legs projecting inwardly from said flange, each leg terminating in an inner enlarged head disposed to engage an abutment on the valve bordering said inlet passage, each collet also having a barb formed on the inner surface of at least one of said legs and disposed to engage the outer surface of the respective first tube.

14. The assembly of claim 13, wherein each leg includes an inclined surface located inwardly of the respective head, and said valve is provided with an inclined abutment bordering the inlet passage and disposed to be engaged by said inclined surface, whereby an outward force applied to said collet will move said inclined surface into engagement with said abutment to thereby wedge said legs inwardly to engage said barbs with said first tube to prevent removal of said first tube from said inlet passage, and axial inward movement of said flange toward said valve will enable said heads to move radially outward to disengage the barbs from said first tubes and permit removal of said first tube from said inlet passage.

15. The assembly of claim 14, wherein each barb is provided with a sharpened tip.

16. The assembly of claim 14, and including first sealing means for sealing each first tube to the respective inlet passage, said first sealing means disposed inboard of the heads of the collet and spaced axially of said heads.

* * * * *

UNITED STATES PATENT AND TRADEMARK OFFICE
CERTIFICATE OF CORRECTION

PATENT NO. : 5,341,846
DATED : August 30, 1994
INVENTOR(S) : NORMAN S. FRAMBERG

It is certified that error appears in the above-indentified patent and that said Letters Patent is hereby corrected as shown below:

Col. 4, Line 33, CLAIM 1, After "disposed" insert --in--

Signed and Sealed this

Seventh Day of February, 1995

Attest:

BRUCE LEHMAN

Attesting Officer    Commissioner of Patents and Trademarks